(12) United States Patent
Wang et al.

(10) Patent No.: US 8,037,903 B2
(45) Date of Patent: Oct. 18, 2011

(54) MICROMACHINED ELECTROWETTING MICROFLUIDIC VALVE

(75) Inventors: Mark Y. Wang, Fremont, CA (US); Zhiliang Wan, Milpitas, CA (US); Harshal Surangalikar, Sunnyvale, CA (US); Guanghua Wu, Dublin, CA (US); Erhan Ata, Sunnyvale, CA (US)

(73) Assignee: Micropoint Bioscience, Inc., Sunnyvale, CA (US)

( * ) Notice: Subject to any disclaimer, the term of this patent is extended or adjusted under 35 U.S.C. 154(b) by 793 days.

(21) Appl. No.: 12/080,794

(22) Filed: Apr. 3, 2008

(65) Prior Publication Data
US 2008/0257438 A1    Oct. 23, 2008

Related U.S. Application Data

(60) Provisional application No. 60/966,533, filed on Apr. 4, 2007.

(51) Int. Cl.
*F15C 1/04*          (2006.01)
(52) U.S. Cl. .............................................. 137/828
(58) Field of Classification Search ............... 137/825, 137/827, 828; 251/129.01
See application file for complete search history.

(56) References Cited

U.S. PATENT DOCUMENTS

| | | | |
|---|---|---|---|
| 5,992,820 A * | 11/1999 | Fare et al. ................. | 251/129.01 |
| 6,068,751 A | 5/2000 | Neukermans | |
| 6,130,098 A | 10/2000 | Handique et al. | |
| 6,143,248 A | 11/2000 | Kellogg et al. | |
| 6,561,224 B1 | 5/2003 | Cho | |
| 6,626,417 B2 | 9/2003 | Winger et al. | |
| 6,750,053 B1 | 6/2004 | Opalsky et al. | |
| 6,843,272 B2 | 1/2005 | Schoeniger et al. | |
| 6,905,882 B2 | 6/2005 | Buechler | |
| 6,958,132 B2 | 10/2005 | Chiou et al. | |
| 7,016,560 B2 | 3/2006 | Ticknor et al. | |
| 7,117,807 B2 | 10/2006 | Bohn, Jr. et al. | |
| 2003/0164295 A1 | 9/2003 | Sterling | |
| 2007/0204926 A1 * | 9/2007 | Beerling et al. ............. | 137/828 |

* cited by examiner

*Primary Examiner* — Craig Schneider
(74) *Attorney, Agent, or Firm* — Gary Baker; Quine Intellectual Property Law Group, P.C.

(57) ABSTRACT

This invention relates to a systems and methods of controlling the flow of a fluid in a capillary or microfluidic channel. A first pair of electrodes can influence the wetting of a fluid front at a relatively hydrophobic surface in the channel. A second pair of electrodes can electrolytically generate a bubble that can stop fluid flow when it contacts the hydrophobic surface. Flow of a fluid in a channel can be stopped on contact with the hydrophobic surface and restarted when an electrostatic field reduces the contact angle of the fluid at the hydrophobic surface. The electrostatic field can be removed and the fluid stopped again when an electrolytically generated bubble contacts the hydrophobic surface to reestablish the blocking contact angle of the fluid, gas and surface.

13 Claims, 10 Drawing Sheets

MICROMACHINED ELECTROWETTING MICROFLUIDIC VALVE

CROSS-REFERENCE TO RELATED APPLICATIONS

The present application is related to a prior application Ser. No. 11/696,401, Micromachined Electrowetting Microfluidic Valve, filed Apr. 4, 2007, by Wang, et al., which was converted to provisional application 60/966,533, of which the present application claims benefit of and priority to; and, which application is incorporated herein by reference.

FIELD OF THE INVENTION

The present inventions are directed to methods and devices for controlling fluid flows. In particular aspects, the invention includes microfluidic valves that can stop and initiate flows based on control of a contact angle at the fluid/surface interface. The valve can be reset to the stop configuration by introduction of a bubble to generate an new liquid/gas/solid interface.

BACKGROUND OF THE INVENTION

Microfluidic devices and "microscopic" fluid handling systems are becoming essential in many important fields. The advantages of fast response times, easy integration, and high volume production make such devices ideal for point-of-care blood analysis and point-of-use chemical and fluid production, analysis and detection. Compared to conventional devices and techniques, these devices have a much smaller footprint and require minimum amount of resources to gather the same amount of information. Because of advances in plastic and silicon micromachining, such devices can take advantage of both the materials and the technologies to make microfluidic devices in large quantities and at lower cost. However, many macro-scale valve configurations are incompatible such small devices, and a need remains for microscale fluid control valves that can be opened and closed with precision.

Many typical microfluidic devices include a top cover in a parallel arrangement with plastic bottom having microchannels of sub-millimeter dimension. The top cover is commonly welded or joined to the bottom to make a sealed microchannel-based fluid handling system (see, U.S. Pat. Nos. 6,750,053 and 6,905,882). An essential aspect of control in microfluidic devices is the ability to stop and resume flow as desired. The devices often rely on capillary forces in the small microchannels to drive fluid flow in the microchannels. In some devices, surface properties, such as, e.g. hydrophobic and hydrophilic properties, have been used to influence flow rates. Because surface tension is often the most dominant of force acting on liquids in the microchannels, change in surface tension (or surface energy) of the liquid can be an effective way to control the flow. For example, U.S. Pat. No. 6,143,248 discloses a capillary stop valve, which uses a change of surface tension achieved by sudden expansion in capillary diameter to control a microfluidic flow There are other methods to control flows, such as using chemical, thermal mechanical, optical, or electrostatic energy as disclosed by U.S. Pat. Nos. 6,561,224, 6,958,132, and 7,117,807. Out of these technologies, electrostatic energy has become a favored option because it can be more energy efficient than, e.g., the thermal technique. The principle of changing surface tension with electrical energy is called electro-capillarity or electrowetting (EW). Electrowetting by modulation of surface electrostatic charges can provide more precise control compared to techniques dependent on channel surface chemistry; and can be more reliable and easy to operate. Electro-capillarity, which is the basis of modern EW was demonstrated more than a century ago by Gabriel Lippmann when he showed that liquid mercury, in contact with an immiscible electrolyte solution, can be made to move inside a capillary by applying a voltage across the mercury-electrolyte interface. This idea was successfully applied to mercury-electrolyte systems, but a major drawback of this idea was electrolytic decomposition or Joule heating of aqueous electrolyte solutions, even when low voltages were applied. To avoid this situation, but still maintain the effect of an electric field, a dielectric layer can be introduced between the fluid and the electrolyte/electrode. This modification of the electrowetting technique is called electrowetting-on-dielectric (EWOD).

EW has been traditionally applied to systems where tiny droplets are manipulated in order to accomplish the pumping, mixing, valving, switching, and injecting actions in a precise manner. U.S. Pat. No. 6,911,132 described an apparatus for manipulating droplets. The apparatus is a single-sided electrode design in which all conductive elements are contained on one surface on which droplets are manipulated. An additional surface can be provided parallel with the first surface for the purpose of containing the droplets to be manipulated. Droplets are manipulated by performing electrowetting-based techniques in which electrodes contained on or embedded in the first surface are sequentially energized and de-energized in a controlled manner. The apparatus enables a number of droplet manipulation processes, including merging and mixing two droplets together, splitting a droplet into two or more droplets, sampling a continuous liquid flow by separating individually controllable droplets from the flow, and iterative binary or digital mixing of droplets to obtain a desired mixing ratio.

Similarly, U.S. Pat. No. 7,016,560 describes devices utilizing elements carried by a fluid in a microchannel to switch, attenuate, shutter, filter, or phase shift optical signals. In certain embodiments, a microchannel carries a gaseous or liquid slug that interacts with at least a portion of the optical power of an optical signal traveling through a waveguide. The microchannel may form part of the cladding of the waveguide, part of the core and the cladding, or part of the core only. The microchannel may also have ends or may be configured as a loop or continuous channel. The fluid devices may be self-latching or may be semi-latching. The fluid in the microchannel is moved using e.g., electrocapillarity, differential-pressure electrocapillarity, electrowetting, continuous electrowetting, electrophoresis, electroosmosis, dielectrophoresis, electro-hydrodynamic electrohydrodynamic pumping, magneto-hydrodynamic magnetohydrodynamic pumping, thermocapillarity, thermal expansion, dielectric pumping, and/or variable dielectric pumping.

In U.S. Pat. No. 6,130,098, the movement and mixing of microdroplets through microchannels is described employing microscale devices, comprising microdroplet transport channels, reaction regions, electrophoresis modules, and radiation detectors. The discrete droplets are differentially heated and propelled through etched channels. Electronic components are fabricated on the same substrate material, allowing sensors and controlling circuitry to be incorporated in the same device. The disclosed apparatus includes droplet transport channels having hydrophobic and hydrophilic regions selectively placed or patterned on the channel walls and surfaces, reaction chambers, gas inlet pathways and vents and detectors. An air chamber is included that is in connection with the transport channel to generate air bubbles inside liquid column to split and generate droplets. The transport microchannel is made from microfabricated silicon and glass substrates separated by a distance. One or more hydrophobic patches, regions or zones are provided in the droplet transport channel to separate a discrete amount of liquid from the sample so that it can be transported further for droplet ejection. This patent also discloses a method on creating and ejecting droplets from a liquid flow in microchannel by using a hydrophobic patch and bubble pressure in a side channel to generate droplets from liquid flow. A transport microchannel and side microchannels for generating droplets are made in a silicon substrate by bulk microfabrication to make the flow channels in silicon.

The advantages of EW (e.g., EWOD) are also extended to continuous flow systems wherein EW electrodes are set up along a microfluidic channel and are actuated as desired to control the fluid flow. Such EW-based systems can be made to incorporate valves and flow barriers in microchannels in order to stop and resume fluid flow as desired. A normally-closed valve can be in the form of a sudden expansion in the microchannel cross-section, or it can be made with a hydrophobic material that is selectively deposited in a narrow patch along the length of the microchannel. Such a hydrophobic patch can acts as a barrier to incoming fluid owing to large contact angle and surface tension energy on the patch.

In the above technologies, the fluids under control are typically kept separated by a slug of gas because the electrowetting forces are often inadequate to disrupt a continuous stream, e.g., without intervention of a mechanical valve. That is, once a flow is allowed at an electrowetting valve, the contact angle is zero and the electrowetting valve no longer has a fluid interface and contact angle to influence control of the flow. As a result of this deficiency, in many applications, a mechanical microvalve is needed to stop and start the flow of a continuous column of fluid in microfluidic channel.

Although electrowetting valve technologies offer some benefits in control of passive microfluidic flows, they typically suffer from an inability to reassert control over flow once they are traversed by a continuous fluid column. The optional incorporation of micromechanical valves can be prohibitively complex and expensive. In biochemistry or related applications, there is a need for a way to cyclically control flows, sample sizes and incubation times.

In view of the above, a need exists for an inexpensive and responsive valve for both starting and stopping microfluidic flows. It would be desirable to have a way to reestablish control of an electrowetting valve in the presence of a continuous fluid column across the valve. There is a need for a capillary to microscale valve that is volumetrically discrete and resettable. The present invention provides these and other features that will be apparent upon review of the following.

SUMMARY OF THE INVENTION

As aqueous fluids flow along surfaces, the flow rate and direction can be influenced by the relative hydrophobic/hydrophilic character of the surface. For example, the fluid flow can be affected by the contact angle between the aqueous fluid and the surface. The methods and devices of the present invention employ combinations of surfaces, e.g., with different and changeable hydrophobic/hydrophilic character to control flow of a fluid. In a particular embodiment, a fluid flow in a capillary channel can be stopped by a hydrophobic surface, started by electrostatically changing the surface to a more hydrophilic character, and optionally stopped again by returning the surface to a more hydrophobic character and introducing of a bubble to reestablish a fluid/gas interface at the hydrophobic surface.

In devices having a fluid flow in a capillary or microcapillary dimension, a flow of a fluid can be prevented by the presence of a low affinity between the fluid and the surface (evidenced by a large contact angle). The surface tension of the fluid can be such that the fluid will not flow across the surface under existing conditions. To initiate flow, the surface tension energy must be overcome by applying an external force, e.g., pneumatic, centrifugal or electrostatic (e.g., by electrowetting). As described herein, for simplicity of fabrication and reliability, a preferred flow control scheme can include a hydrophobic stop valve influenced by electrowetting (EW) actuation. The device operation can be based on the principle of electro-wetting wherein an electric field is applied at the solid-liquid interface to change interfacial surface energy thus enhancing or impeding fluid flow. Such a device can be provided using a micromachined electrowetting microfluidic microvalve (e.g., at the bottom plate of a micro-channel) having one or more hydrophobic patches patterned on a dielectric coating covering one or more conducting regions in a substrate. The conducting regions can be electrically actuated to modify the wettability of the surface of hydrophobic patches.

It is an object of the present invention to provide a micromachined electrowetting microfluidic microvalve. It is another object of the present invention to provide a micromachined electrowetting microfluidic microvalve that controls the flow of a continuous fluid column. It is a further object of the present invention to provide a micromachined electrowetting microfluidic microvalve that controls the flow of a continuous fluid column to achieve desired incubation timing for a reaction in the fluid. It is another object of the present invention to provide a micromachined electrowetting microfluidic microvalve that is embedded in the micro-channel to control the flow of a continuous fluid column in such microchannel. It is a further object of the present invention to provide a micromachined electrowetting microfluidic microvalve that is embedded in the micro-channel acting as a start/stop valve for the continuous fluid column. It is another object of the present invention to provide a bio-compatible micromachined electrowetting microfluidic microvalve.

In many embodiments, the present invention can be a module intended for use in medical or related diagnostic industries where small quantities of liquids, inorganic or biological, are analyzed at point of care or point of use, based on the concepts of microfluidics and micromachined Lab-on-Chip (LOC) without the need for the conventional bulky and costly equipment to get the same information.

The present invention is typically a micro-valve module in microfluidic device, such as diagnostic cartridge, that is capable of controlling the flow of minute quantities of a fluid. The invention can work by stopping the liquid flow at a hydrophobic patch on a microchannel surface. Electrical actuation, according to the electrowetting principle, can be used to resume flow by reducing the fluid contact angle at the hydrophobic patch. In another aspect, the present invention is further directed to making a micro-valve module in a microfluidic device in which the flow of a fluid column can be stopped by generating a bubble upstream that will stop at the patch and returning the hydrophobic patch to a more hydrophobic character. For electrical actuation of contact angle control and/or electrolytic gas production, conducting metal regions can be deposited on a bottom plate of a micro-channel using, e.g., photolithography techniques. These conducting regions are placed below the hydrophobic patch with or without an insulating dielectric layer in between.

The present invention also discloses the method to operate the micromachined electrowetting valve by applying electrical voltage across the conducting regions to modulate the affinity of the hydrophobic patch for a fluid. For example, a liquid column can be introduced into a micro-channel under conditions that allow the liquid to flow until it is stopped by surface tension pressures from a large contact angle at a hydrophobic patch surface in the channel. The liquid flow can be restarted by applying an electric voltage across conducting regions adjacent to the hydrophobic regions, electrostatically reducing the contact angle and allowing the fluid to flow.

Methods of present invention include, e.g., operation of a micromachined electrowetting valve by applying electrical voltage across conducting regions to generate stop bubbles by electrolysis. For example, a method of controlling a flow of a fluid in a channel can include providing a channel comprising an internal surface and a hydrophobic patch disposed upon the surface, providing a first electrically conductive region exposed on the internal surface, flowing a fluid from the first electrically conductive region along the channel toward the hydrophobic patch, and applying an electrolytic voltage to the first electrically conductive region to electrolytically generate a bubble. As a result, the bubble can be forced by the fluid flow onto the hydrophobic patch to form an interface with adequate surface tension to stop the fluid flow. The fluid flow can then be reinitiated by providing a second electrically conducting region adjacent to the hydrophobic patch with the patch between the conducting region and the channel interior. When a controlling voltage is applied to the second electrically conducting region, the applied electric field can reduce the contact angle of the fluid at the hydrophobic patch bubble, thereby reducing resistance to the flow and allowing the fluid to flow over the hydrophobic patch.

The present inventions can include electrolytically generated gas bubble in a stop valve. For example, a microfluidic valve can include a microchannel having a conductive region and a fluid in the microchannel in contact with the conductive region. The valve can be configured so that application of a voltage to the conductive region electrolytically generates a bubble within the channel, thus stopping flow of the fluid in the microchannel. The position of the bubble can be precisely controlled by locating a hydrophobic patch in the microchannel downstream from the bubble generating conductive region.

The present inventions include microfluidic stop valves that can be started by controlling electrowetting forces, and reset to a stopped condition by introduction of a gas bubble into the fluid flow. For example, a resettable microfluidic stop valve can include a microfluidic channel with an internal surface, a hydrophobic patch disposed on the surface and overlying a first conductive region electrically isolated from the channel, a second conductive region in electrical contact with the channel, and a third conductive region in electrical contact with the channel. In operation, in the presence of a low voltage potential between the first and second conductive regions, an aqueous fluid does not flow past the hydrophobic patch due to a prohibitively large contact angle between the fluid and patch. When a fluid flow is desired past the stop valve, a higher voltage potential can be introduced between the first and second conductive regions so that the contact angle is reduced to allow the aqueous fluid to flow past the hydrophobic patch. To reestablish the stop condition, an electric current flowing through the third conductive layer generates a gas bubble in the fluid that can reestablish the contact angle at the hydrophobic patch in the channel (e.g., with the low voltage potential reestablished between the first and second conductive regions).

In a preferred embodiment of the resettable stop valve, the electric current flows through the second conductive region, the fluid, and the third conductive region to electrolytically generate the gas bubble. In many embodiments, the third conductive region is located upstream in the channel from the hydrophobic patch so that, e.g., the generated bubble can flow downstream to reestablish the large contact angle at the hydrophobic patch. In a preferred embodiment, the second and third conductive regions are located upstream from the hydrophobic patch and both generate gas (e.g., hydrogen and oxygen) when an electric current flows between them.

On one embodiment, the microfluidic valve comprises a microfluidic channel with an interior surface, two or more hydrophobic patches disposed along the microfluidic channel, a first conductive region underlying the patches with the patches between the first conductive region and the channel interior, and a second conductive region disposed along the microfluidic channel at positions between the two or more hydrophobic patches. In this configuration, an aqueous fluid in the channel will not flow past the hydrophobic patches in the presence of a first voltage potential between the first and second conductive regions, and the fluid will flow past the hydrophobic patches in the presence of a second greater voltage potential between the first and second conductive regions.

In preferred embodiments of the resettable stop valve, the second conductive region is upstream from the hydrophobic patch. In many embodiments, the microchannel comprises cross-section dimension less than 1 mm. In some embodiments, the stop valve includes a second hydrophobic patch disposed on the channel surface overlying the first conductive region or overlying a fourth conductive region. In some embodiments, one or more additional hydrophobic patches are disposed on the channel surface and overly the first conductive region or overly an additional electrostatic conductive region. In some embodiments, an electric current flows in a circuit comprising the second conductive region, the fluid and a third conductive region, to generate the gas bubble. In preferred embodiments, the third (electrolytic) conductive region is located upstream in the channel from the hydrophobic patch. In an embodiment, both the second and third conductive regions are located upstream from the hydrophobic patch and both generate gas when an electric current flows between them.

In another aspect of the electrowetting valves, the valves can have multiple hydrophobic patches. For example, a microfluidic valve can include a microfluidic channel comprising an interior surface, two or more hydrophobic patches disposed along the microfluidic channel, a first conductive region underlying the two or more patches with the patches between the first conductive region and the channel interior, and a second conductive region disposed along the microfluidic channel at positions between the two or more hydrophobic patches. In use, an aqueous fluid in the channel will not flow past the hydrophobic patches in the presence of a first low voltage potential between the first and second conductive regions, but the fluid will flow past the hydrophobic patches in the presence of a second higher voltage potential between the first and second conductive regions. The second conductive region can be electrical contact with the channel interior, or optionally neither the first conductive region nor the second conductive region is in electrical contact with the channel interior.

DEFINITIONS

Unless otherwise defined herein or below in the remainder of the specification, all technical and scientific terms used herein have meanings commonly understood by those of ordinary skill in the art to which the present invention belongs.

Before describing the present invention in detail, it is to be understood that this invention is not limited to particular devices or biological systems, which can, of course, vary. It is also to be understood that the terminology used herein is for the purpose of describing particular embodiments only, and is not intended to be limiting. As used in this specification and the appended claims, the singular forms "a", "an" and "the" include plural referents unless the content clearly dictates otherwise. Thus, for example, reference to "a component" can include a combination of two or more components; reference to "fluid" can include mixtures of fluids, and the like.

Although many methods and materials similar, modified, or equivalent to those described herein can be used in the practice of the present invention without undue experimentation, the preferred materials and methods are described herein. In describing and claiming the present invention, the following terminology will be used in accordance with the definitions set out below.

As used herein, the term "microfluidic" refers to systems or devices having a fluid flow channel with at least one cross sectional dimension less than 1000 μm. For example, a microfluidic channel can have a cross-sectional dimension of 500 μm or less, 300 μm or less, 100 μm or less, 50 μm or less, or 10 μm or less. In many embodiments, the channel dimension is about 50 μm, but typically not less than 1 μm. Valves of the invention can also be used in larger scale channels, such as capillary channels, which are channels wherein a fluid can flow by capillary action.

"Hydrophobic" and "hydrophilic" are relative terms. A first surface is more hydrophobic than a second surface if it has a higher affinity for lipids than the second surface, or repels water more than the second surface. The relative hydrophobicity of surfaces can be objectively determined, e.g., by comparing the contact angles of an aqueous solution on those surfaces. For example, if the contact angle of water is greater on the first surface than on the second surface, the first surface is considered more hydrophobic than the second surface.

An "conductive region", as used herein, refers to a region of material that is a conductor of electricity. The conductive region can function to complete a circuit with a flow of electrical current and/or can provide a local electrical potential that generates an electrostatic field, e.g., without actual completion of an electrical circuit.

BRIEF DESCRIPTION OF THE DRAWINGS

The foregoing and other objects of the invention will be more clearly understood from the following description when read in conjunction with the accompanying drawings.

DETAILED DESCRIPTION

Figure 1:
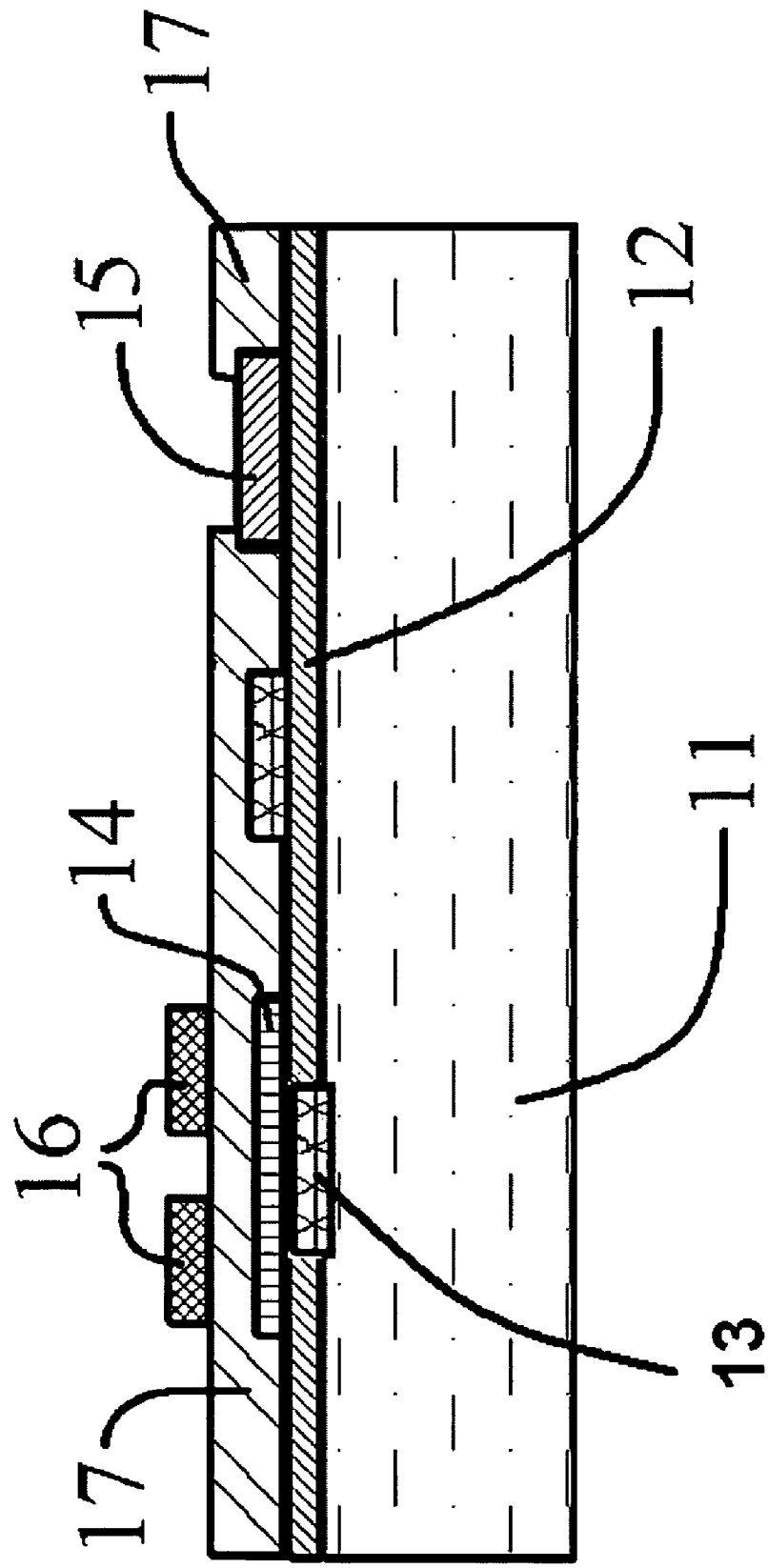
FIG. 1 is a cross-sectional view of a bottom plate for the micromachined electrowetting microfluidic valve showing a described layout.

The principle of changing surface tension with electrical energy is called electro-capillarity or electrowetting (EW). Earlier incarnations of EW were designed with liquid mercury in contact with an electrolyte solution and a voltage applied between the mercury and electrolyte a thin capillary tube. The voltage changed the contact angle of the mercury with the capillary tube so that liquid mercury could be made to rise or drop in the capillary tube depending on the voltage applied. Use of this technique has been extended to various liquids and electrolytes. In order to avoid heating of the liquid due to electric current flow, a dielectric layer can be located between the electrode and the electrolyte (liquid). This technique is called electrowetting-on-dielectric (EWOD) and is an important modification to the EW technique. Where a sequential "stop and resume" flow operation is needed, EW-based systems, as disclosed in prior arts, can incorporate flow barriers in the form of hydrophobic patches or zones at selected locations along the channel to stop fluid flow. Alternately, the flow barriers associated with EW systems can impede flow with an abrupt expansion in the microchannel cross-section, effectively increasing the contact angle. To overcome the surface tension at the large flow barrier contact angle, external force, e.g., pneumatic, centrifugal, thermal or electrostatic, has been applied to resume flow.

Applying voltage adds electrical energy to the system and changes the contact angle θ according to the equation:

$$\cos\theta = \cos\theta_o + 1/\sigma LG \cdot [(\in_o \in)/(2dV^2)] \quad (1)$$

where, θo is the contact angle in absence of voltage, θ is the contact angle after voltage is applied, σLG is the surface tension at liquid-gas interface, $\in_o$ and $\in$ are permittivity of free space and dielectric layer respectively, V is the applied voltage, and d is the thickness of the dielectric layer. Thus, applying voltage can reduce the contact angle for the liquid causing the liquid to flow. A combination of a hydrophobic patch and EW actuation can provide a stop valve in preferred embodiments of this invention.

EW-based devices can be broadly classified onto droplet-based and continuous flow systems. Droplet-based systems use small discrete liquid droplets to accomplish transport, mixing or splitting actions. Continuous flow systems depend on transport and control of the whole liquid volume (e.g., in channels) and may be used to create droplets as desired. The droplet-based systems typically use a flexible platform where the transport of the droplets is not restricted to closed microchannels as in continuous flow setup. Droplet-based systems are often inadequate in terms of fluid volume and fluid isolation for many applications. Capillary and microfluidic systems can be preferred, especially when the flow surfaces must include chemical reagents for analytical reactions that can be damaged or contaminated due to exposure to atmospheric gases and moisture.

In a continuous flow system, liquid flow can be stopped by using a hydrophobic patch or zone that defines a flow barrier in the microchannel. For example, a flow of aqueous liquid can be stopped at the edge of the hydrophobic patch. In the absence of an external electric field, the behavior at fluid-electrode interface inside a microchannel is determined by surface tension (or surface energy) and capillary forces. When an external force is applied in the form of an external electric field, the presence of an electric charge at the solid-liquid interface can change the affinity of the surface for the liquid and thus modulate the contact angle. The surface tension back pressure at hydrophobic patch can be reduced to the point that the fluid will flow past the patch.

Stop valves utilizing hydrophobic patches with EW control can be fabricated by any suitable methods. A basic valve structure can include, e.g., a bottom substrate, a top cover bonded or joined to seal a watertight cavity in the substrate, conductive electrodes patterned onto the cavity surfaces. Typically, at least one electrode is covered with a hydrophobic dielectric. Plastics offer a cheap material to make the bottom and top substrates, but metal patterning is difficult to accomplish on plastic substrates. We have found that silicon is a preferred choice for a bottom substrate since metal electrodes can be easily patterned using common semiconductor processing techniques. The top cover is preferably a transparent material, such as, e.g., plastic or glass, to accommodate optical detection of fluid constituents. When plastic substrates are used, microchannels can be formed in the substrate by techniques such as injection molding, or laser ablation. As an alternative, a double-sided adhesive spacer tape with known properties on the sidewalls can be sandwiched between the top and bottom substrate in order to make up the watertight cavity.

Such devices are capable of performing many tasks, for example, (i) acting as a microvalve where the hydrophobic patch is a stopping element which is overcome by applying some for of external energy; (ii) performing chemical reactions wherein the liquid is guided into a reaction chamber and diagnostic zone for quantitative assay measurements; and (iii) generating droplets from the liquid column inside the microchannels, e.g., for ejection of precise droplet volumes in a controlled manner.

Stop Valves

The present inventions include resettable stop valves for use, e.g., in capillary and microfluidic systems. A typical resettable microfluidic stop valve includes a combination of an electrowetting surface and a bubble generating surface. When an aqueous fluid is introduced into a dry capillary channel having relatively hydrophilic surfaces, the fluid will flow to fill the tube by capillary action. A hydrophobic surface can be applied to a section of the channel to stop capillary flow of the aqueous fluid. A pair of electrodes can be mounted so that a voltage potential can be applied across the hydrophobic surface, thus rendering the hydrophobic surface more hydrophilic, in a controllable fashion. Upstream from the hydrophobic surface, at least one electrode can be in electrically conductive contact with the channel interior so that an applied voltage can electrolytically generate a bubble of gas.

In operation, flow of the introduced aqueous fluid can stop in the channel when it contacts the hydrophobic surface. Flow can be reinitiated when a voltage potential across the hydrophobic surface renders it more hydrophilic. However, this electrowetting valve can not be reset by simply removing the voltage potential because there is no longer a gas to provide a liquid/gas/solid interface at the hydrophobic surface. The present invention solves this problem by providing a gas bubble in the fluid, e.g., by electrolysis of the fluid, that can flow to the hydrophobic surface to reestablish the flow stopping liquid/gas/solid interface in the absence of the EW voltage potential.

The resettable stop valve preferably controls flow in a capillary or microfluidic system of the invention. Capillary channels typically include a cross-sectional dimension of about 5 mm or less, more typically, 1 mm or less. Microfluidic systems include one or more channels having a cross-sectional dimension on the scale of micrometers, e.g., less than a millimeter, 500 micrometers (µm) or less, 250 µm or less, 100 µm or less, 50 µm or less, 25 µm or less, 10 µm or less, or 1 µm or less.

The resettable valves can be part of microfluidic systems that include two or more chambers fluidly connected with microfluidic channels. For example, the systems can be chemical assay or biological assay chips, e.g., with sample fluids flowing to contact reagents to produce a detectable reaction product. Chambers of the systems can hold samples, reagents, buffers, wash solutions, and the like. Chambers can be configured to function as storage reservoirs, volumetric measurement chambers, incubation chambers, reaction chambers, analyte or reaction product capture chambers, detection chambers, waste chambers, and/or the like. Stop valves of the invention can be located in channels of such systems to control volumes and flows of fluids between chambers and channels with volumetric and temporal precision.

Hydrophobic surfaces that stop aqueous fluid flows in the channels are typically more hydrophobic than adjacent surfaces of the channels. For example, a hydrophobic patch in a channel can be a surface of the channel that induces a larger contact angle in a fluid front than a surface of the channel adjacent (typically, just upstream) to the hydrophobic patch. A hydrophobic patch can be formed by treating a channel surface with a relatively (e.g., relative to the adjacent surface) hydrophobic material, such as a silicate, lipid, hydrocarbon, and/or the like. The hydrophobic patch can be formed by a hydrophobic dielectric material applied over a conductor, which dielectric is made from a relatively hydrophobic material, such as a plastic or poly-fluorocarbon. The hydrophobic patch can be formed indirectly by treating the adjacent channel to make it relatively hydrophilic. For example, hydrophobic patch can be the surface of a plastic substrate, while the adjacent channels can be treated with a surface active agent.

It is notable that although aqueous fluid flows are the more common applications, related systems can control the flow of more hydrophobic fluids, such as solutions based on organic solvents. For example, channels can be fabricated with hydrophilic patches to stop hydrophobic fluid flows and controllable by modulation of electrostatic fields. Bubbles can be generated in the hydrophobic fluid by electrolysis of gas forming constituents (or gas injection, evolution of gas by application of heat, etc.) to reestablish a stop in the hydrophobic fluid flow at the hydrophilic patch.

The resettable stop valves of the invention can include two or more conductive regions in electrically conductive contact with the channel interior and/or mounted to effectively provide an electrostatic influence on a channel surface.

Electrowetting conductors typically include a first electrode embedded in a channel surface and separated from the channel interior with a dielectric, and a second electrode in electrically conductive contact with the channel interior. In many embodiments, a first electrode is embedded in a channel wall behind a dielectric layer and/or hydrophobic layer. A second electrode is in conductive contact with the channel interior upstream from the first electrode. When a fluid flows, e.g., to contact both the second electrode and the hydrophobic surface in front of the first electrode, an electrostatic field can be generated by applying a voltage between the two electrodes. The electrostatic field can modulate the hydrophobicity of the hydrophobic surface, affect the contact angle of the fluid at the surface, and determine whether the fluid will cross the hydrophobic surface.

Two or more electrolytic conductors in a resettable valve are typically in electrically conductive contact with the channel interior. One of the electrolytic conductors can also function as one of the electrowetting conductors, e.g., a ground or common electrode. To provide a gas bubble by electrolysis of an aqueous fluid, at least 1.2 volts is applied across the fluid to evolve hydrogen ($H_2$) gas at the cathode and oxygen ($O_2$) gas at the anode. In order not to generate two separate bubbles up stream from the hydrophobic (usually EW) surface, the cathode and anode can be located together upstream, or one electrode can be downstream from the hydrophobic surface. In one embodiment, a very precise bolus of fluid can be captured in a channel between two gas bubbles generated separately at an anode and at a cathode separated by some distance in a channel.

Methods of Controlling Fluid Flow

Flow of fluids in capillary or micro channels can be accomplished by providing a liquid/gas/solid surface interface and influencing the contact angle between the liquid and solid at the interface. A stably stopped aqueous fluid front at a hydrophobic patch can be allowed to flow past the patch by electrostatically electrowetting the hydrophobic surface. A fluid flowing over a hydrophobic patch can be stopped by inserting a bubble into the flow so that the contact angle of the generated fluid front is too great to overcome under prevailing driving pressures.

The methods of controlling a fluid flow can include, e.g., provision of a resettable valve of the invention, flowing the fluid to stop at a hydrophobic EW surface of a channel, applying an EW voltage to generate an electrostatic field at the EW surface to allow the fluid to continue flow, cessation of the EW voltage, application of an electrolytic voltage to generate an bubble upstream from the EW surface, and allowing the bubble to flow into contact with the EW surface where the renewed hydrophobic character of the surface can stop the fluid front established by the bubble.

The first step in controlling fluid flow in the inventive methods is to provide, e.g., the systems described in the Stop Valves section above. For example, microchannels can be provided in a substrate, e.g., by deposition of materials through a mask, chemical etching, laser etching, molding of a plastic substrate, and the like. Channel surfaces can be made to vary in hydrophobicity, e.g., by application of hydrophilic materials such as surface active agents, application of hydrophobic materials, construction from materials having the desired hydrophobicity, ionizing surfaces with energetic beams, and/or the like. Conductors can be, e.g., mounted on surfaces, embedded into substrates, deposited by vapor deposition of a metal or semiconductor, and/or the like. Voltages can be applied to conductors through lead lines to a voltage source, such as a battery, rectifier and the like. The voltage can be controllable with, e.g., a switch, variable resistor, computer interface, and the like.

Flowing a fluid can be by any suitable force or combination of forces. For example, fluids can flow in microchannels of the methods by gravity, pneumatic pressure, hydraulic pressure, capillary action, electroosmosis, and/or the like. In many embodiments, an aqueous sample is applied to a sample chamber to flow by gravity to a microfluidic channel, where the fluid flows can be driven substantially by the combination of gravitational and capillary forces. Such a fluid flow can be stopped by a hydrophobic patch providing a sufficiently large contact angle with the fluid for the fluid surface tension to resist the fluid driving pressure.

Applying a voltage across the hydrophobic patch can allow the fluid to flow in response to the forces described above, such as gravity and capillary action. In one embodiment, the voltage can be applied across the hydrophobic surface by application of the voltage to a conductor under the surface and to a second conductor electrode in contact with the fluid. In this case, a capacitive electrostatic field can be established across the non-conductive hydrophobic surface between the conductive fluid and the conductor under the hydrophobic surface. In other embodiments, both of the electrodes are electrically insulated from the fluid, but still provide electrostatic fields that can influence the contact angle of the fluid at the patch. In still other embodiments, both conductors are in electrically conductive contact with the fluid, which fluid may or may not be a conductor itself, thus influencing the contact angle of the fluid at the patch.

Generating a bubble by electrolysis can be by any means appropriate to the particular application. In most embodiments, the voltage is a direct current of more than 0.5 volts, more than 1 volt, 1.2 volts or more, 2 volts or more, 5 volts or more, 12 volts, or more. In preferred embodiments, the fluid includes one or more electrolytes that promote the flow of electrical current in the fluid. In preferred embodiments, the constituents of the fluid do not electroplate an electrode or generate undesirable gasses, such as, e.g., chlorine. In other embodiments, electrolytes, reducible constituents, or oxidizable constituents are included in the fluid that can be electrolyzed into a desirable gas.

EXAMPLES

The following examples are offered to illustrate, but not to limit the claimed invention.

Example 1

An Electrowetting Valve

Figure 2:
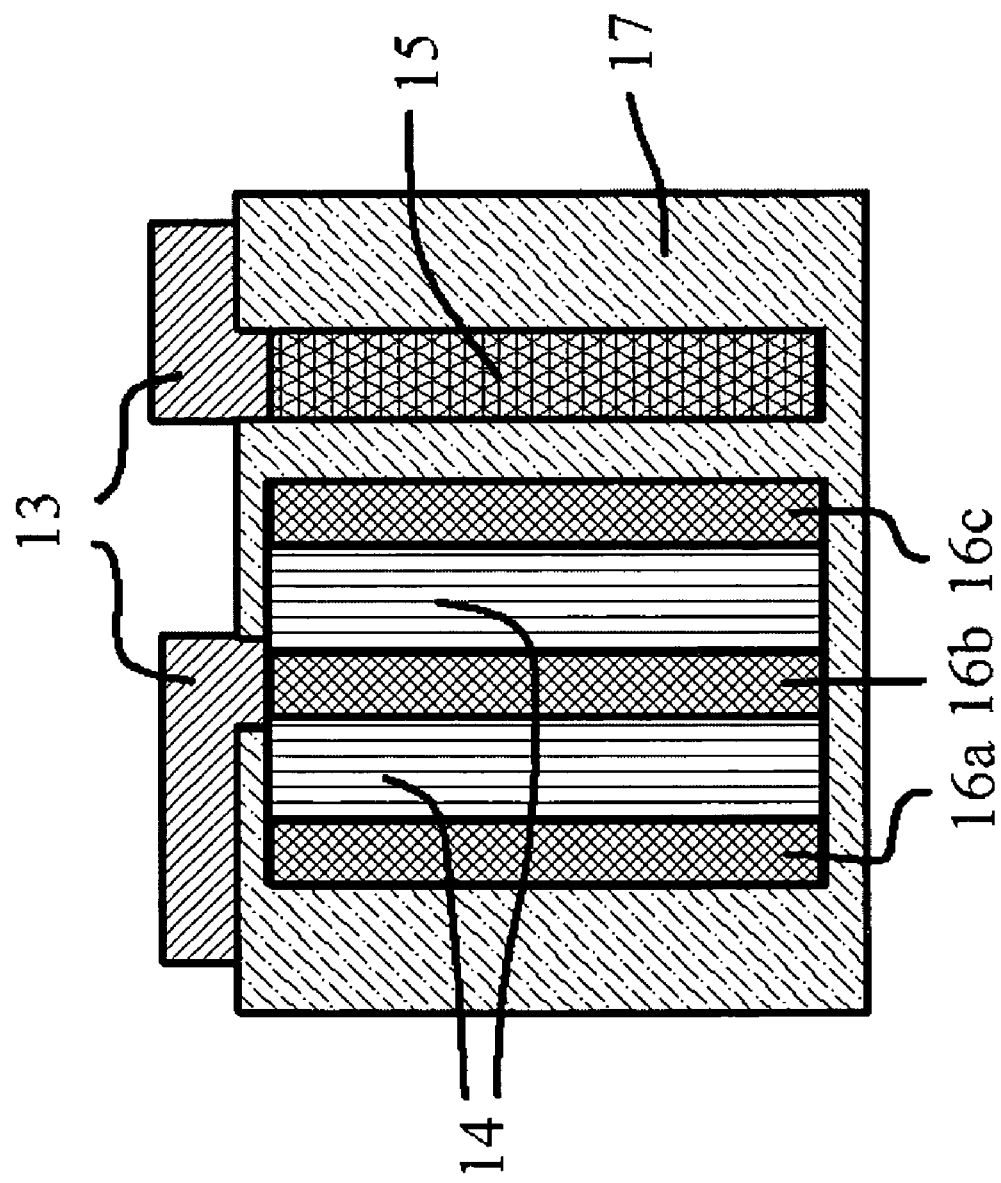
FIG. 2 shows a top plan view of a bottom plate for the micromachined electrowetting microfluidic valve according to one preferred embodiment of electrode and hydrophobic surface layouts.

An electrowetting valve can be provided with a conductive electrode under a hydrophobic patch. FIG. 1 shows a cross-sectional view of a bottom plate 1 for a micromachined microfluidic valve according to one preferred embodiment of current invention. The bottom plate comprises a first dielectric layer 12 deposited on top of the silicon substrate 11. Typically, this first dielectric layer 12 is made of silicon nitride that is deposited on the silicon substrate 11 to serve as an isolation layer from the silicon. Thin metal conducting layers including a first conducting region 14 and a second conducting region 15 can be fabricated on top of the first dielectric layer 12. The conducting regions 14 and 15 are typically made of Au, Pt, or ITO, and are deposited on top of first dielectric layer 12 using Physical Vapor Deposition (PVD) machines commonly available in semiconductor industry. The conducting regions 14 and 15 are patterned with photolithography techniques into small electrode areas of 100 µm to 2 mm wide, as shown in FIG. 2. The electrodes are made of thin Au, Pt or ITO layers with interconnecting lines between thin electrodes and thick contact pads 13. Contact pads 13 serve to make electrical connection with the external electrical circuitry with or without wire-bonding. The first conducting region 14 can serve as a reference or ground electrode, and the second conducting region 15 can serve as a working or driving electrode, or vice verse. Conventionally, if a conducting region 14 or 15 is not patterned and is present as an overlaying layer over the whole area of the said silicon substrate 11, then that conducting layer, either region 14 or 15, becomes the reference electrode and the other electrode is used as a driving electrode.

To avoid the direct contact between electrodes and liquid, a second dielectric layer 17 can be employed. Dielectric materials like essentially pure $SiO_2$ or other polymeric layers like Parylene, can be deposited on top of conducting regions 14 and 15. $SiO_2$ is preferred for its better compatibility to silicon microfabrication techniques and is widely used as an insulation layer in semiconductor industry. A chemical vapor deposition (CVD) machine can be used to deposit the thin layer of second dielectric layer 17 on the conducting regions 14 and 15 that are already patterned on the silicon substrate 11. The second dielectric layer 17 can then be patterned with photolithography techniques over the conducting regions 14 and 15.

The flow stopping element in the microchannel can be a hydrophobic patch 16 of a known length, preferably a fraction of the total length of the microchannel. The hydrophobic patch 16 can be patterned on top of the conducting layer 14 patterned earlier with the second dielectric layer 17 in between. Microfabrication of hydrophobic patch 16 can include spin coating a hydrophobic material, such as, e.g., a layer of the TEFLON AF amorphous fluoro-polymer resin, onto the second dielectric layer 17. Typically, the hydrophobic patch material is relatively hydrophobic compared to the channel surface dielectric layer. The hydrophobic patch 16 can be further coated with photoresist coating, and then exposed to UV light to expose the hydrophobic patch 16 layer, e.g., by etching the photoresist with oxygen plasma to provide the hydrophobic patch 16 at desired locations on the second dielectric layer 17. These locations can be, e.g., photo-lithographically aligned to the microfabricated electrodes and also to the position of the adhesive spacer with microchannel.

FIG. 2 is a top plan view of a bottom plate for the micromachined electrowetting microfluidic valve according to one preferred embodiment of the present invention. In this figure, electrically EW conductive region 14 is behind an insulating dielectric cover. Conductor 15 is in electrical contact with a fluid that would flow (typically left to right) across the surface shown. In certain preferred embodiments of present invention, conductive regions 14 are covered with the second dielectric layer 17 to electrostatically influence fluid contact angles in the region without the flow of current. In many instances the conductive region 15 would be in electrically conductive contact with a fluid on the surface to act as a reference (e.g., ground) relative to any voltage applied to the EW conductive regions 14. As shown in this figure, there are three parallel and equally spaced hydrophobic patches 16a, 16b and 16c arranged on top of all or part of the EW conductive region 14. The width and separation between hydrophobic patches 16a, 16b and 16c can be adjusted and pre-determined (e.g., by calculations or empirically) to give the best results in stopping and starting the continuous flow of a liquid column 20, as shown, e.g., in FIG. 3. Similarly, the size of conducting region 15, and the gap between conducting region 15 and hydrophobic patch 16c, can also be adjusted to provide the desired influence on the fluid contact angle for a particular fluid in a particular channel.

Figure 3:
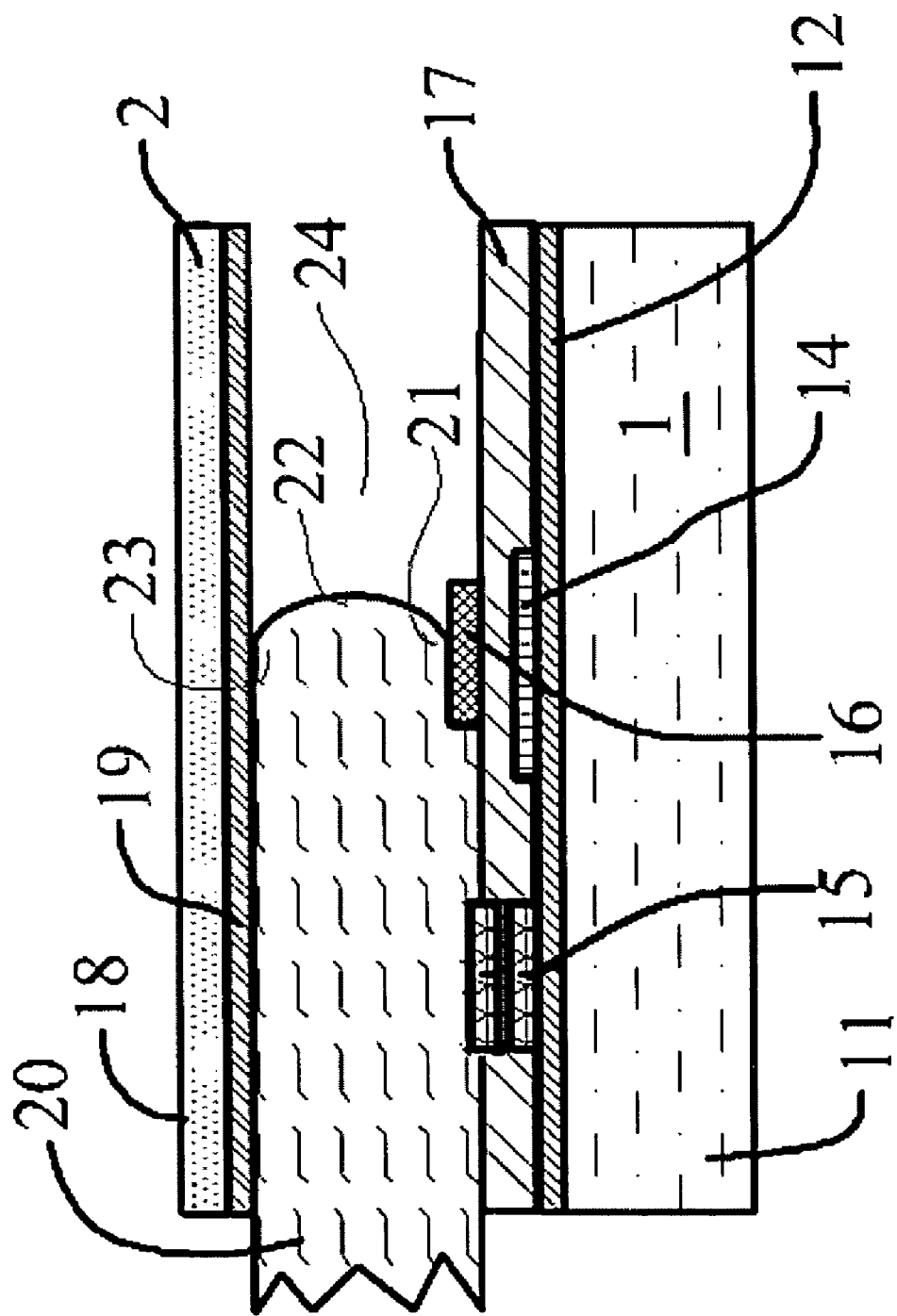
FIG. 3 shows a cross-sectional view of a microfluidic channel incorporating a micromachined electrowetting microfluidic valve showing a schematic diagram of a fluid front stopped by a hydrophobic surface in a channel.

FIG. 3 illustrates a micromachined electrowetting microfluidic valve according to one preferred embodiment of the present invention. A fluid column 20 is bounded in a microfluidic channel consisting of a bottom plate 1 substrate and a top plate 2. The top plate 2 can have a glass or plastic substrate 18 coated with a dielectric layer 19. As the fluid column 20 moves in the channel, the fluid front 22 can make contact with the hydrophobic patch 16 at interface 21 on the bottom plate 1. The fluid front 22 can also make contact with top plate 2 at interface 23. At interface 21, the fluid column 20, the hydrophobic patch 16 and the air 24 can form a three-phase (liquid, solid and air) contact point. The height of microfluidic channel can be the same as that for the fluid column 20, or not. The fluid column 20 can flow in the channel under the capillary force. When the front 22 of fluid column 20 reaches the hydrophobic patch 16, the fluid contact angle at the hydrophobic interface 21 can be quite large, so that the fluid will not flow beyond the patch 16, e.g., without application of additional fluid pressure or an electrostatic force to reduce the contact angle. Accordingly, the fluid column 20 can be stopped at the hydrophobic patch 16. When an electric voltage is applied between conducting regions 14 and 15, the surface energy of hydrophobic patch 16 can be modified, e.g., reducing the fluid contact angle at the interface 21, and allowing the fluid column 20 flow in the channel.

In order to achieve flow control or to modulate a flow rate, the electric voltage applied between conducting regions 14 and 15 can be adjusted. The electrowetting effect can exert controlling influence when voltage is applied over a certain threshold. For example, flow of fluid column 20 can experience substantial resistance even as it flows over the hydrophobic patches at the EW region. In an aspect of the invention, the flow of fluid column 20 over the patch 16 can increase on application of a higher voltage differential across conductive regions 14 and 15. Therefore, by adjusting the voltage applied to the conducting regions 14 and 15, the flow rate of fluid column 20 over the hydrophobic patch 16 can be modulated. This can be useful, e.g., to control the incubation time of a reaction taking place in a reaction chamber upstream from the EW valve just described. Optionally, the gate can be used to control flows into a reaction chamber or detection chamber downstream from the gate.

Example 2

Preferred EW Surface Designs

Figure 4:
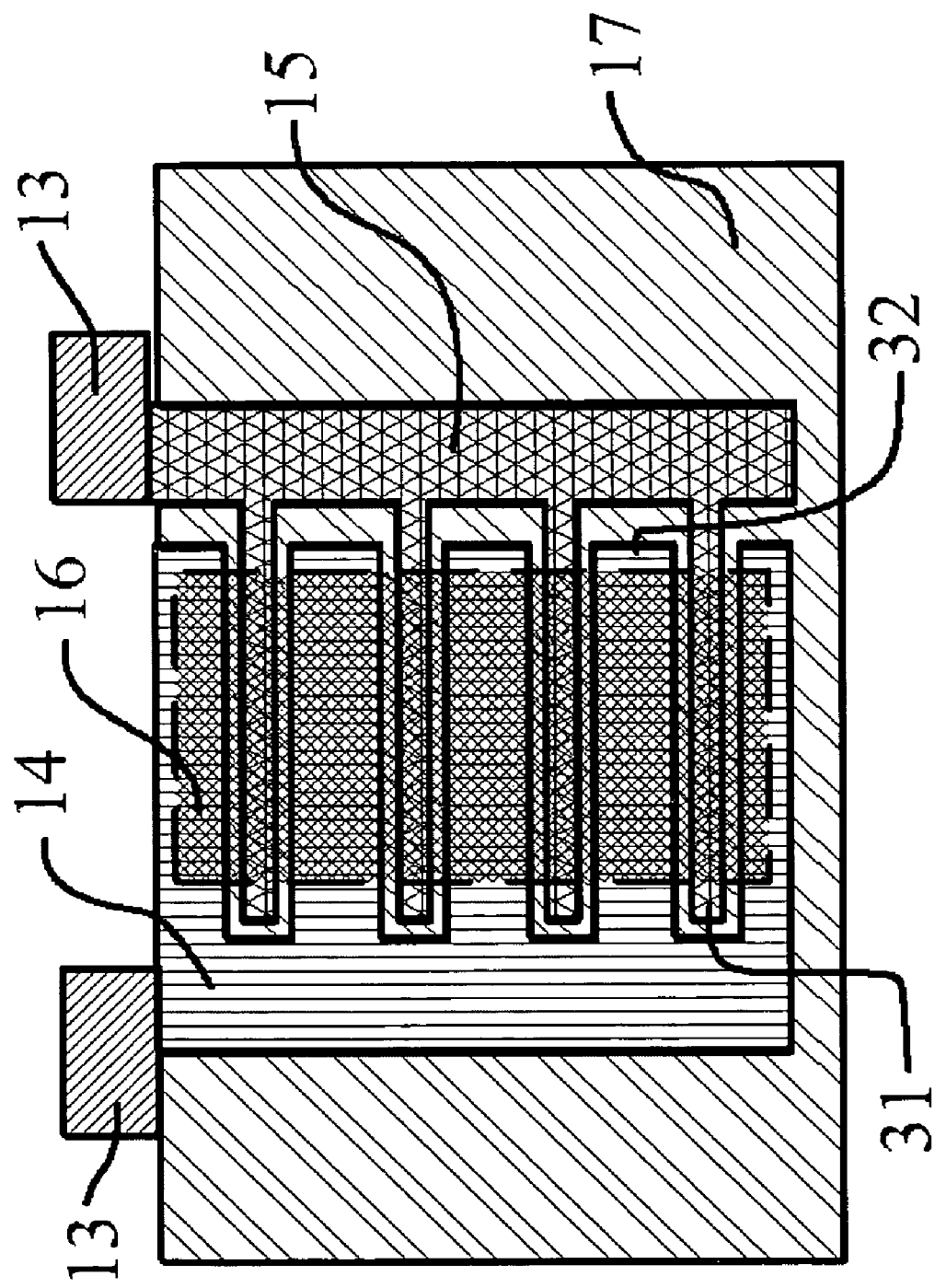
FIG. 4 shows a top plan view of a bottom plate for the micromachined electrowetting microfluidic valve showing one configuration of electrodes and hydrophobic surfaces in a schematic EW valve.
Figure 5:
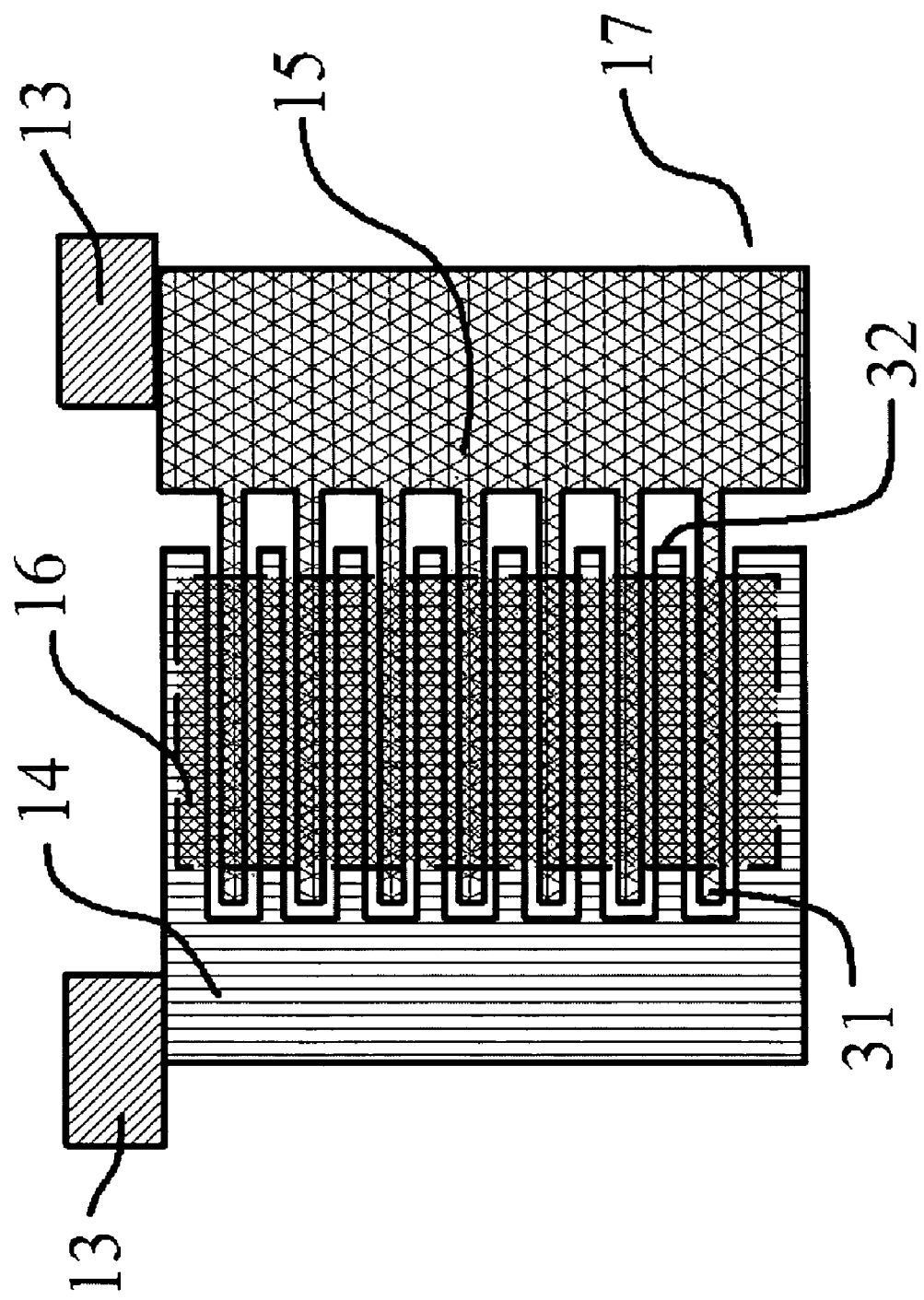
FIG. 5 shows a top plan view of a bottom plate for the micromachined electrowetting microfluidic valve according to a further preferred embodiment of the present invention.

The layout and arrangement of conducting regions 14 and 15 can have many different configurations. For example, FIGS. 4 and 5 show optional schemes according to the preferred embodiments of present invention. The size of both electrodes 32 and 31 (associated with conductors 14 and 15, respectively), the separation between electrodes 31 and electrodes 32, and the number of electrodes 31 and 32 all can vary based on the particular application. The hydrophobic patch 16 can optionally cover the areas electrodes 31 and 32 full, or only cover a part of their areas.

Figure 6:
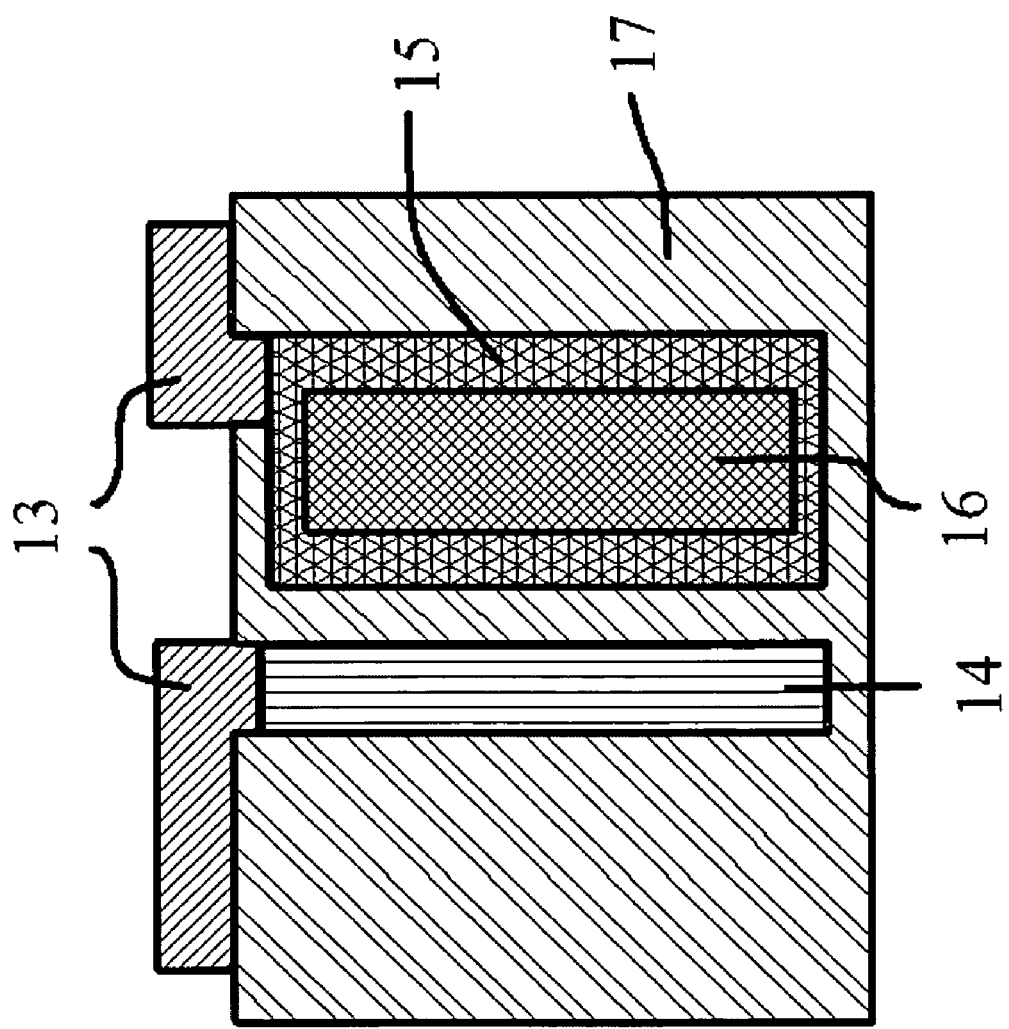
FIG. 6 shows a top plan view of a bottom plate for the micromachined electrowetting microfluidic valve according to another preferred embodiment of the present invention.
Figure 7:
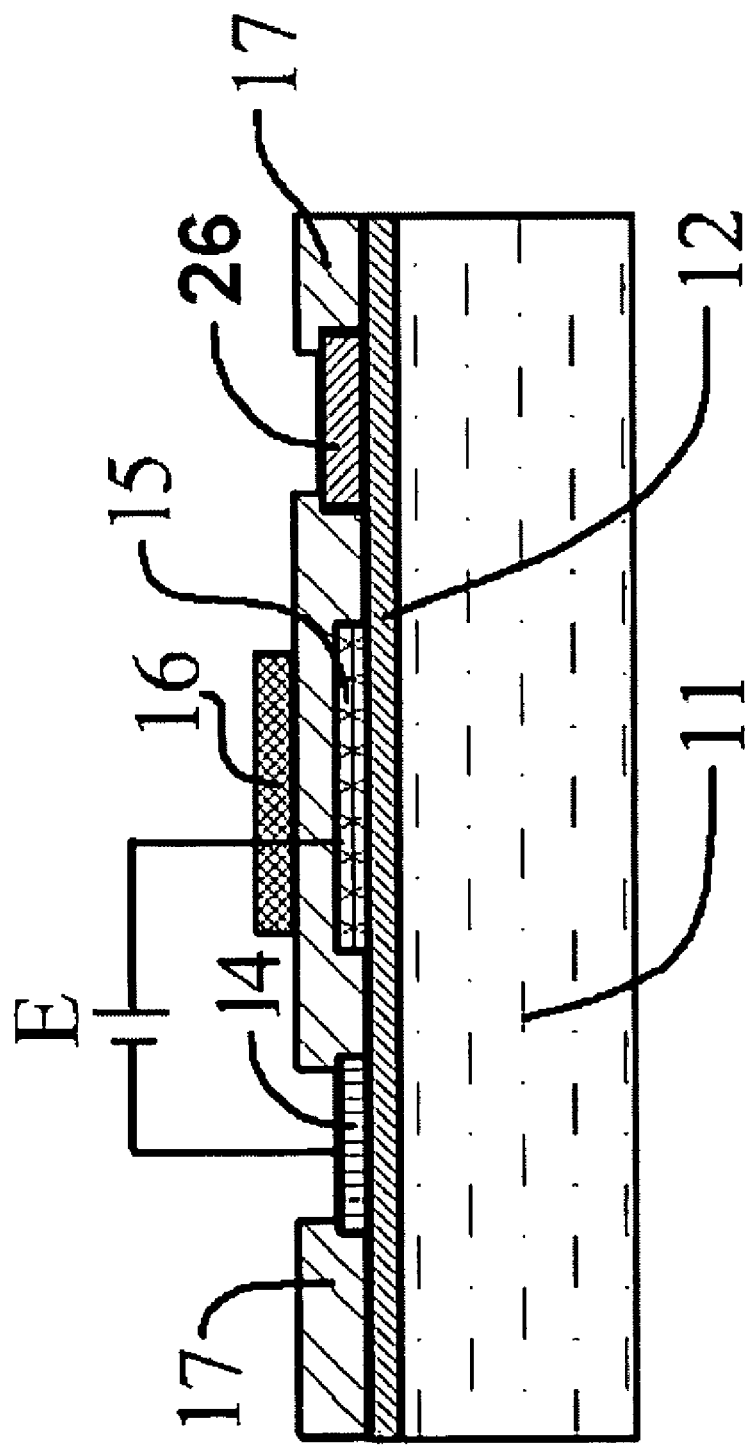
FIG. 7 shows a cross-sectional view of a bottom plate for the micromachined electrowetting microfluidic valve showing a schematic diagram of an EW valve capable of generating a resetting bubble.

According to another preferred embodiment of present invention, the conducting regions 14 and 15 can be arranged in a scheme as illustrated in FIG. 6. In this figure, the conducting region 14 is not covered by the second dielectric layer 17, and is thus exposed to a fluid flowing in such a microchannel. To use this scheme, the conducting region 14 can act as a ground electrode when a voltage E is applied between conducting regions 14 and 15. FIG. 7 shows a cross sectional view of this preferred embodiment.

Example 3

Resetting a Valve

Figure 8:
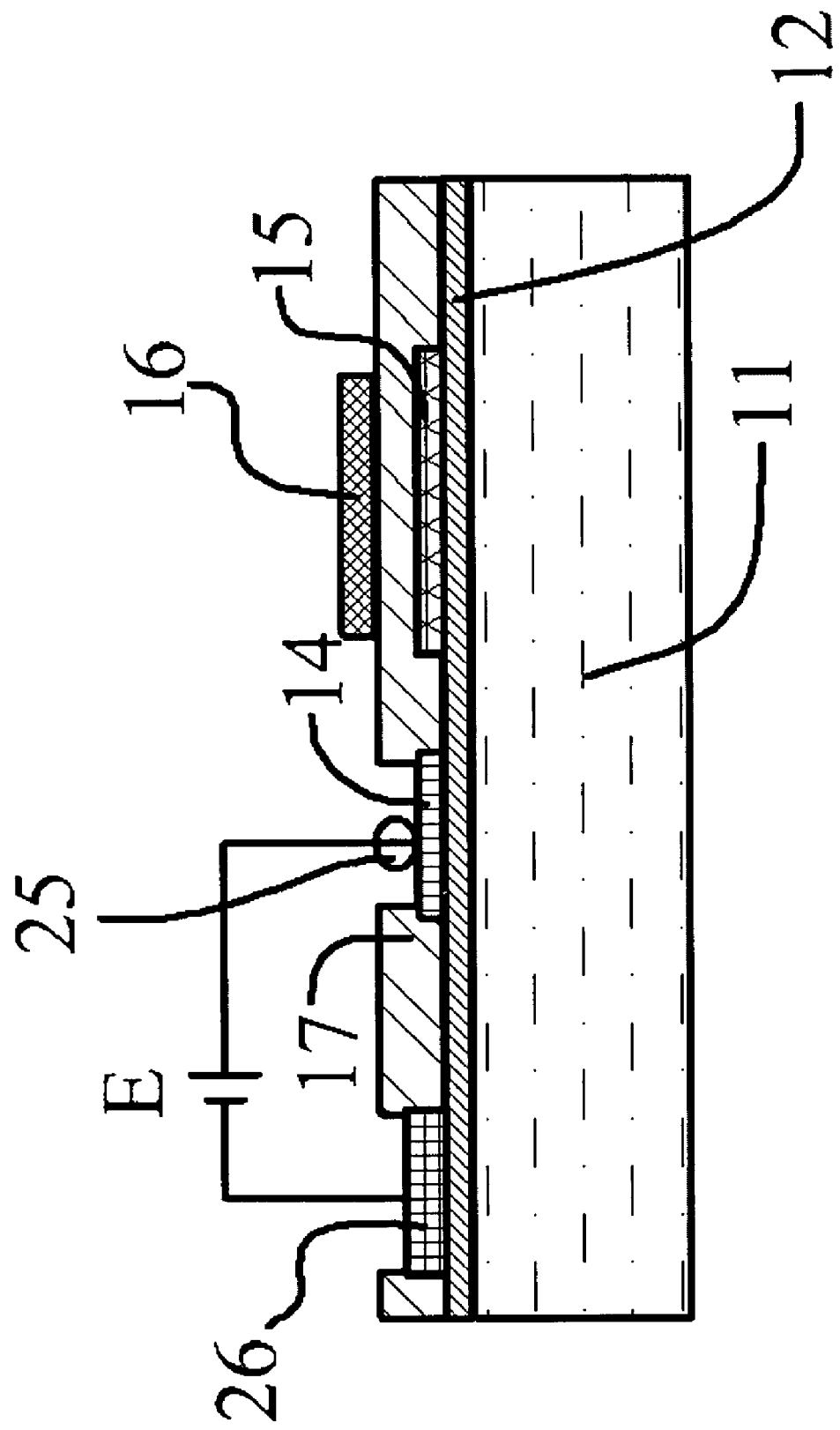
FIG. 8 shows a cross-sectional view of a bottom plate for the micromachined electrowetting microfluidic valve according to another preferred embodiment of the present invention wherein electrodes are positioned for creation of gas bubbles.
Figure 9:
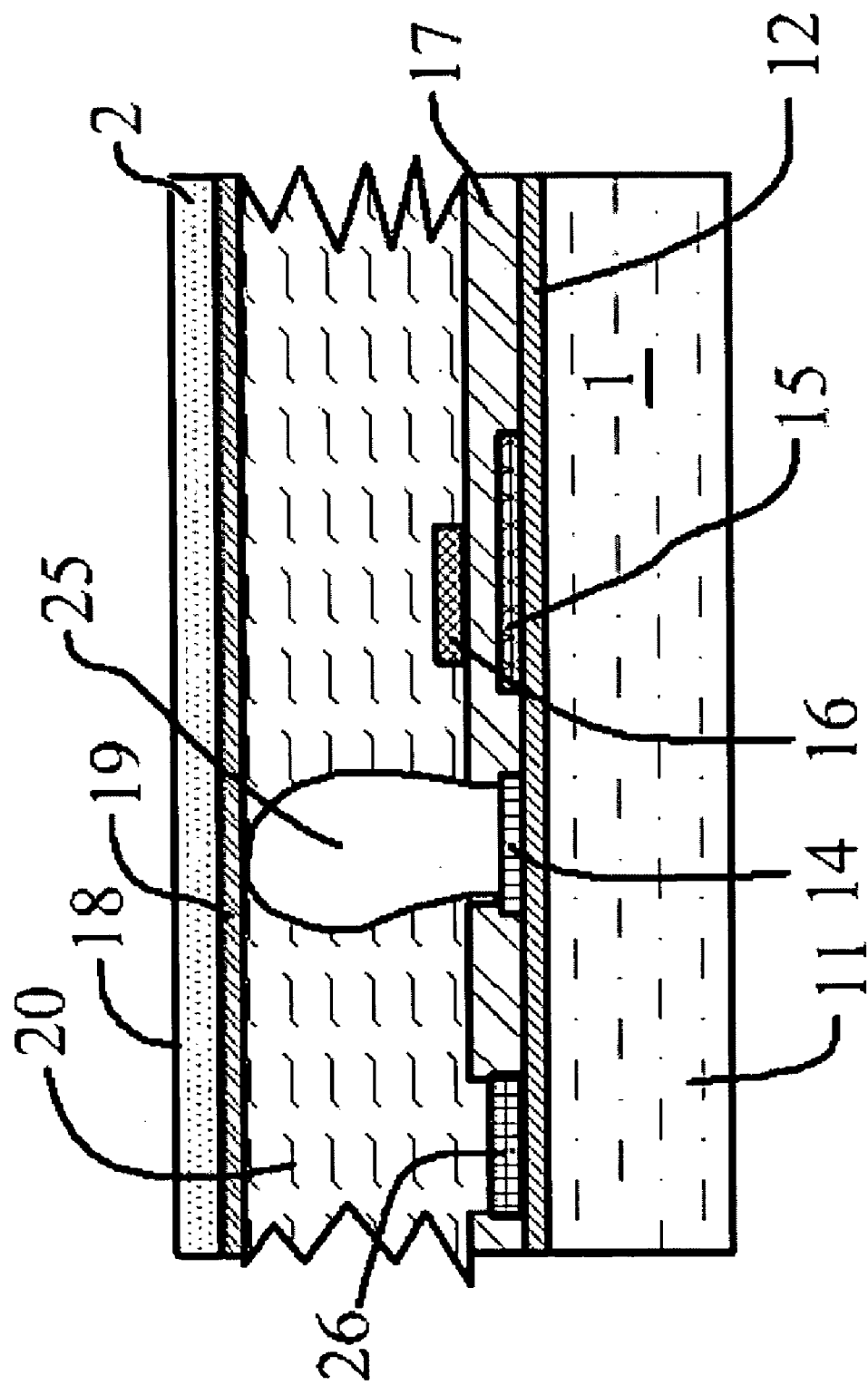
FIG. 9 shows a schematic diagram of a microfluidic channel cross-sectional view incorporating a micromachined electrowetting microfluidic valve wherein an electric current has created a gas bubble upstream from a hydrophobic gate.
Figure 10:
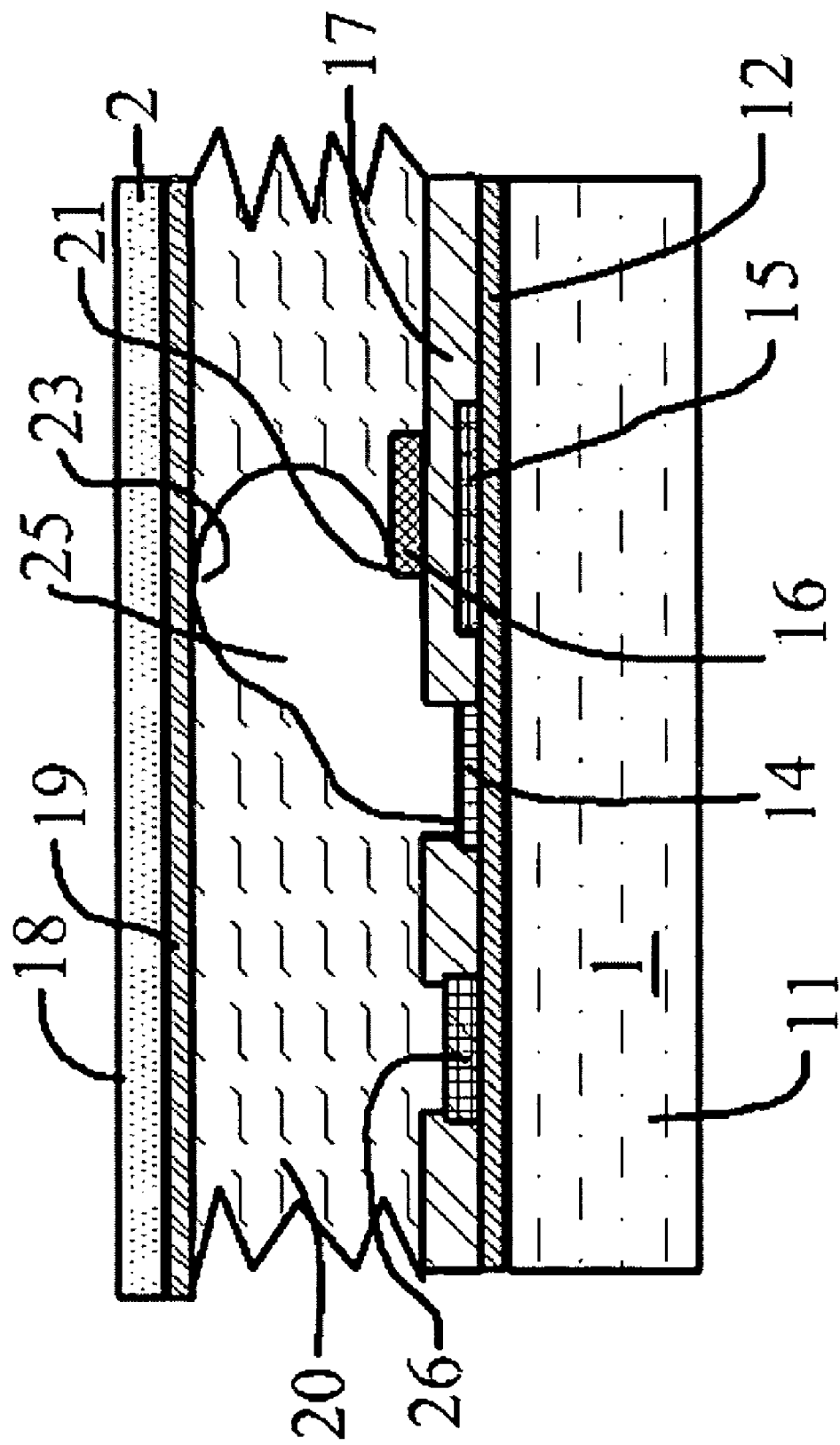
FIG. 10 shows a cross-sectional view of a microfluidic channel incorporating a micromachined electrowetting microfluidic valve according to another preferred embodiment of the present invention, wherein a generated gas bubble has regenerated a liquid/gas interface at the front of a fluid flow.

According to another preferred embodiment of present invention, the electrowetting valve can also be used to stop the fluid flow in the micro channel. FIGS. 8 to 10 schematically illustrate reestablishment of a flow stop condition on a hydrophobic stop gate. In this case, a third conductive region 26 can be employed, as shown in FIG. 8 to provide a second electrically conductive electrode on the surface of the microfluidic channel. In the embodiment of FIG. 8, electrolysis and gas evolution (e.g., $H_2$ and/or $O_2$ from water) can be achieved by applying an electric voltage across conducting regions 14 and 26, resulting in current flow when a conductive fluid traverses the capillary channel between the regions to complete the electric circuit. When an electric voltage E is applied across the conductive regions 14 and 26, with a positive lead of the electric voltage E connected to conductive region 14, as shown in FIG. 8, bubble 25 can be generated, e.g., at the interface of fluid and conductive region 14. The rate of bubble 25 generation can be a function of voltage E applied. Increasing the applied electric voltage E can result in the faster generation of bubbles 25. In many preferred embodiments, no bias voltage is applied across conducting region 15 at the hydrophobic gate during electrolysis process of gas evolution.

As long as the voltage E is applied with its positive lead connected to the conducting region 14, bubbles 25 will be generated. As the time goes, small bubbles will be assimilated to become a large bubble 25, as shown in FIG. 9. When this bubble 25 reaches the hydrophobic patch 16 (e.g., due to its volume and/or due to the bubble being forced down stream by a fluid flow, as shown in FIG. 10), the three-phase (air, liquid and solid) contact can be regenerated when the fluid front contacts the hydrophobic patch to create an interface at 21. At, or before, this time, voltage E can be removed from the conducting regions 14 and 15. The result can be a reestablished stop gate with the hydrophobic patch 16 is reverted back to its hydrophobic status and the associated high capillary stop resistance preventing flow of fluid column 20 down the channel.

It is understood that the examples and embodiments described herein are for illustrative purposes only and that various modifications or changes in light thereof will be suggested to persons skilled in the art and are to be included within the spirit and purview of this application and scope of the appended claims.

While the foregoing invention has been described in some detail for purposes of clarity and understanding, it will be clear to one skilled in the art from a reading of this disclosure that various changes in form and detail can be made without departing from the true scope of the invention. For example, many of the techniques and apparatus described above can be used in various combinations.

All publications, patents, patent applications, and/or other documents cited in this application are incorporated by reference in their entirety for all purposes to the same extent as if each individual publication, patent, patent application, and/ or other document were individually indicated to be incorporated by reference for all purposes.

What is claimed is:

1. A resettable microfluidic stop valve comprising:
a microfluidic channel with an internal surface;
a hydrophobic patch disposed on the surface and overlying a first conductive region not in electrical contact with the channel;
a second conductive region in electrical contact with the channel, wherein in the presence of a first voltage potential between the first and second conductive regions an aqueous fluid does not flow past the hydrophobic patch due to a prohibitively large contact angle between the fluid and the patch, and wherein in the presence of a second voltage potential between the first and second conductive regions the large contact angle is reduced thus allowing the aqueous fluid to flow past the hydrophobic patch; and,
a third conductive region in electrical contact with the channel, whereby an electric current flowing through the third conductive layer and the fluid generates a gas bubble in the channel.

2. The valve of claim 1, wherein the microchannel comprises cross-section dimension less than 1 mm.

3. The valve of claim 1, wherein the second conductive region is upstream from the hydrophobic patch.

4. The valve of claim 1, further comprising a second hydrophobic patch disposed on the channel surface and overlying the first conductive region or overlying a fourth conductive region.

5. The valve of claim 1, wherein the electric current flows in a circuit comprising the second conductive region, the fluid and third conductive region, to generate the gas bubble.

6. The valve of claim 1, wherein the third conductive region is located upstream in the channel from the hydrophobic patch.

7. The valve of claim 1, wherein both the second and third conductive regions are located upstream from the hydrophobic patch and wherein both generate gas when an electric current flows between them.

8. The valve of claim 1, wherein the first voltage potential is established between the first and second conductive regions in the presence of the gas bubble in the channel.

9. A microfluidic valve comprising:
a microfluidic channel comprising an interior surface;
two or more hydrophobic patches disposed along the microfluidic channel;
a first conductive region underlying the patches with the patches between the first conductive region and the channel interior; and,
a second conductive region disposed along the microfluidic channel at positions between the two or more hydrophobic patches;
wherein an aqueous fluid in the channel will not flow past the hydrophobic patches in the presence of a first voltage potential between the first and second conductive regions, and wherein the fluid will flow past the hydrophobic patches in the presence of a second voltage potential between the first and second conductive regions, which second voltage potential is greater than the first voltage potential.

10. The valve of claim 9, wherein the second conductive region is in electrical contact with the channel interior.

11. The valve of claim 9, wherein the neither the first conductive region nor the second conductive region is in electrical contact with the channel interior.

12. A method of controlling a flow of a fluid in a channel, which method comprises:
- providing a channel comprising an internal surface and a hydrophobic patch disposed upon the surface;
- providing a first electrically conductive region exposed on the internal surface of the channel;
- flowing a fluid from the first electrically conductive region along the channel toward the hydrophobic patch;
- electrolytically generating a bubble in the channel by applying a first voltage to the first electrically conductive region,
- whereby the bubble is forced by the fluid flow onto the hydrophobic patch forming an interface with adequate surface tension to stop the fluid flow; and providing a second electrically conducting region adjacent to the hydrophobic patch with the patch between the conducting region and the channel interior; and, applying a second voltage to the second electrically conducting region; wherein said application of the second voltage produces an electric field that reduces a contact angle of the fluid at the hydrophobic patch bubble, thus reducing resistance to the flow and allowing the fluid to flow over the hydrophobic patch.

13. The method of claim 12, further comprising modulating the second voltage, thereby modulating a flow rate of the fluid.

* * * * *